F. S. HASBROUCK.
Book Binding.

No. 9,275. Reissued July 6, 1880.

Witnesses
John Becker
E. P. Jessup.

Inventor.
F. S. Hasbrouck,
by his Attys.
Brown & Brown

N. PETERS, PHOTO-LITHOGRAPHER, WASHINGTON, D. C.

UNITED STATES PATENT OFFICE.

FREDERICK S. HASBROUCK, OF NEW YORK, N. Y.

BOOK-BINDING.

SPECIFICATION forming part of Reissued Letters Patent No. 9,275, dated July 6, 1880.

Original No. 207,806, dated September 10, 1878. Application for reissue filed March 13, 1880.

*To all whom it may concern:*

Be it known that I, FREDERICK S. HASBROUCK, formerly of West Brighton, in the county of Richmond and State of New York, but now of the city and county of New York, in said State of New York, have invented certain new and useful Improvements in Book-Binding, of which the following is a specification.

Though generally applicable for all kinds of books, my improvements are especially intended for use in press-copying books.

One of the objects sought to be attained is to admit of the yielding of books without injury when subjected to great strain, as in a press, or opened wide or dropped.

Another object is to enable the book, when opened, to be laid flat out, the leaves lying nearly flat from the center; also, to make a strong and very durable binding.

One of my improvements consists in the combination, with the leaves or folios of a book, of needles arranged within the same, and elastic cords or straps passed transversely through notches or mortises in the leaves or folios over the said needles and attached to the covers, whereby the yielding of the book at all points is provided for, the opening thereof facilitated, and its durability increased.

Another improvement consists in the combination, in a book, of a series of leaves or folios, needles arranged within the same, binding cords or straps passed transversely through notches or mortises in the leaves or folios over said needles and secured to the cover, and a back independent of and detached from said leaves or folios, and made of or comprising elastic material.

Another improvement consists in a book made of a series of leaves or folios having a notch or mortise in their backs, or a series of such notches or mortises, in each of which notches or mortises is laid a binding cord or strap, held therein by means of a needle laid inside the said series of leaves or folios and passing outside the said cord or band.

Figure 1:
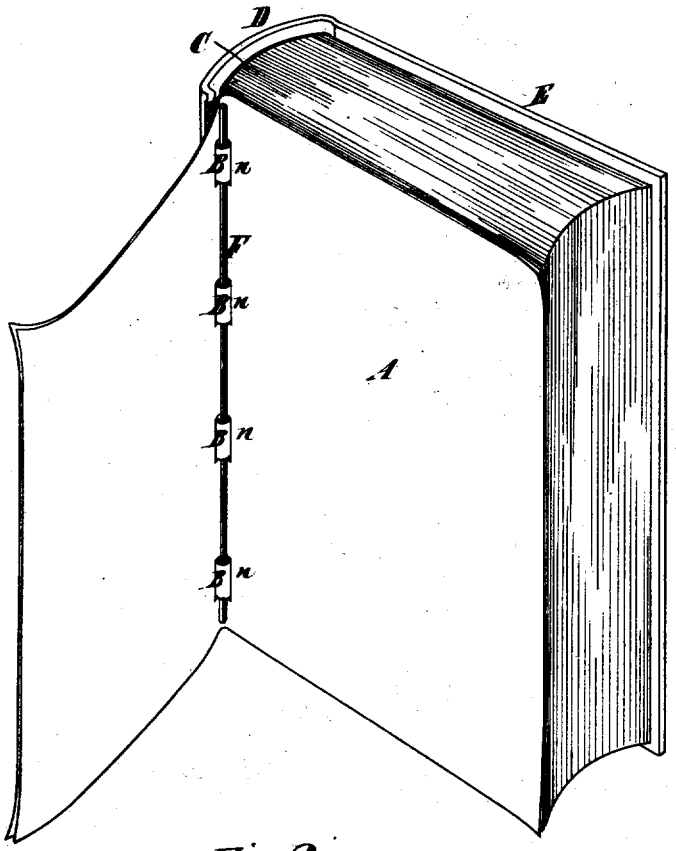
Figure 2:
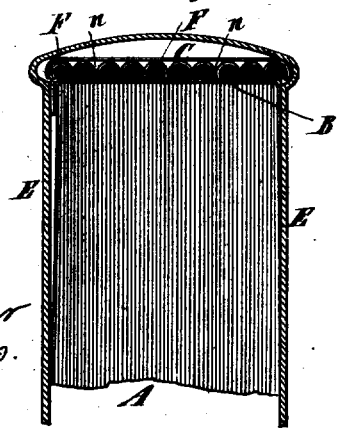
Figure 3:
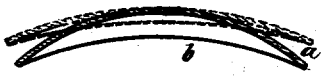
Figure 4:
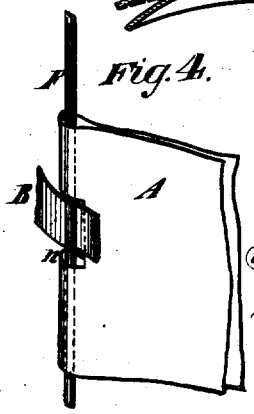

In the accompanying drawings, Figure 1 is a perspective view of a partly-opened book embodying my invention and having one cover removed. Fig. 2 is a transverse section of the back part of the same. Fig. 3 is an edge view of a modified form of binding-strap; and Fig. 4 is a perspective view of a portion of the folios or leaves.

Similar letters of reference designate corresponding parts in all the figures.

A designates a number of folios or leaves folded and laid inside one another. B designates binding cords or straps securing the several folios together to form a book. These cords or straps may be made of elastic material, such as india-rubber, or of other suitable material.

I have shown the back edges of the folios notched or mortised at intervals, as at *n*, for the reception of the said cords or straps, and as furnished in the middle with needles or thin rods F, made of metal or other suitable material, across which the cords or straps pass, and so secure the folios together.

The advantage of thus combining the needles with these binding cords or straps and notched or mortised folios or leaves is that they afford provision for opening books embodying them quite wide without incurring injury, as the folios are free to adjust themselves readily relatively to each other, and also obviate much of the damage which is entailed from straining a book, because the cords or straps may slide with but little friction over the needles to the place where they will exert least strain, whereas in books bound as heretofore this advantage is not attained.

If desirable, I may employ binding-straps of the kind illustrated in Fig. 3, and consisting of a bow-shaped back piece, *a*, and a thinner cross-piece, *b*, for uniting the ends of the former. These may be made of india-rubber, or, indeed, of steel, if desirable. The needles F will fit behind the part *b*.

On the opening of a book having these binding-straps the latter flatten out, or the parts *b* bow outward and permit the book to be opened flat, no matter how large.

D designates the back, forming part of the cover of the book. It is shown as independent of and detached from the leaves or folios, and made preferably of india-rubber, hard or soft, or other elastic material, but, if desirable, rendered elastic by the insertion within it of steel springs. It may be secured to the side pieces, E, of the cover in the usual or any other suitable manner, and the ends of the cords or straps B may be fastened to it by means of an adhesive substance, by sewing, riveting, or otherwise. The elasticity of this back enables the book to be opened or strained to a great extent in any way without receiving injury, because it can yield under the strain and subsequently resume its former position.

These improvements are especially applicable to press-copy books, because they provide so completely for the yielding of the book that it cannot be injured through the strain exerted by the press. Some of the improvements may be embodied in pamphlets or binders.

A book made in the manner above described will not only be exceedingly strong and adapted to open and display its leaves in the best way, but in the process or detail of the construction there is a very large gain in time and cost over anything that has been before done in this line. No expensive tools or complicated machinery are needed to unite the several parts, nor is any sewing or like troublesome manipulation required.

The few and simple steps of the work can be easily understood by any ordinary workman, and can be well and thoroughly executed by him.

I am aware that heretofore several corrugated metal stays or wires have been inserted in each folio and held in place by sewing or cord twisted around them, and also that a metal back has been used in memorandum-books having eyes passing through the folios and held upon the same by a wire. These I do not claim.

What I claim as my invention, and desire to secure by Letters Patent, is—

1. In a book consisting of a series of leaves or folios notched or mortised in the back, the combination therewith of a needle laid in each of said series and outside of a cord or strap placed in each notch or mortise, substantially as and for the purposes set forth.

2. In a book, the combination, with a series of leaves or folios, of needles arranged within the same, and elastic binding cords or straps passed transversely through notches or mortises in the leaves or folios over the said needles and attached to the covers, substantially as specified.

3. In a book, the combination of a series of leaves or folios, needles arranged within the same, binding cords or straps passed transversely through notches or mortises in the leaves or folios over said needles and permanently attached to the cover, and a back independent of and detached from said leaves or folios, forming part of a cover, and made of or comprising elastic material, substantially as specified.

F. S. HASBROUCK.

Witnesses:
CHANDLER HALL,
T. J. KEANE.